United States Patent
Kaiser et al.

(10) Patent No.: US 8,456,053 B2
(45) Date of Patent: Jun. 4, 2013

(54) INSULATION ASSEMBLY FOR A STATOR CORE

(75) Inventors: Edward L. Kaiser, Orion, MI (US); Khwaja M. Rahman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 628 days.

(21) Appl. No.: 12/550,113

(22) Filed: Aug. 28, 2009

(65) Prior Publication Data

US 2011/0050026 A1    Mar. 3, 2011

(51) Int. Cl.
*H02K 3/34*    (2006.01)

(52) U.S. Cl.
USPC .......................................... 310/215; 310/201

(58) Field of Classification Search
USPC .................................... 310/201, 215
See application file for complete search history.

(56) References Cited

U.S. PATENT DOCUMENTS

| | | | | |
|---|---|---|---|---|
| 2,060,935 A | * | 11/1936 | Grob | 310/225 |
| 4,160,926 A | * | 7/1979 | Cope et al. | 310/215 |
| 4,533,580 A | * | 8/1985 | Otty | 428/34.2 |
| 4,808,872 A | * | 2/1989 | Lund et al. | 310/215 |
| 5,763,978 A | * | 6/1998 | Uchida et al. | 310/215 |
| 5,936,326 A | * | 8/1999 | Umeda et al. | 310/179 |
| 6,900,572 B2 | * | 5/2005 | Omura | 310/215 |
| 7,075,206 B1 | * | 7/2006 | Chen | 310/179 |
| 7,141,908 B2 | * | 11/2006 | Holmstrom et al. | 310/254.1 |
| 2009/0267441 A1 | * | 10/2009 | Hiramatsu et al. | 310/208 |

FOREIGN PATENT DOCUMENTS

JP    2009-195009    *    8/2009

OTHER PUBLICATIONS

Nakayama et al., JP 2009-195009, Aug. 2009, Machine Translation from JPO Patent Office website.*

* cited by examiner

*Primary Examiner* — Burton Mullins
(74) *Attorney, Agent, or Firm* — Ingrassia Fisher & Lorenz, P.C.

(57) ABSTRACT

An assembly for providing electrical insulation in a stator core of a vehicular electric machine is provided. The stator core has a channel and the assembly comprises a first conductive element disposed through the channel, and a second conductive element disposed through the channel and substantially adjacent to the first conductive element. The assembly also comprises a first electrically insulating film having a first end residing between the first and second conductive elements.

13 Claims, 4 Drawing Sheets

INSULATION ASSEMBLY FOR A STATOR CORE

TECHNICAL FIELD

The present invention generally relates to vehicular electric machines, and more particularly relates to an assembly for electrically insulating conductive elements in the stator core of a vehicular electric machine.

BACKGROUND OF THE INVENTION

In recent years, advances in technology have led to substantial changes in the design of automobiles. One of these changes involves the complexity, as well as the power usage, of various electrical systems within automobiles, particularly alternative fuel vehicles. For example, alternative fuel vehicles such as hybrid vehicles often use electrochemical power sources, such as batteries, ultracapacitors, and fuel cells, to power the electric traction machines (or motors) that drive the wheels, sometimes in addition to another power source, such as an internal combustion engine.

Such traction machines typically include a rotor assembly that rotates on a shaft within a stationary stator assembly. The rotor and stator assemblies each generate magnetic fields that interact with each other to cause the rotor assembly to rotate and produce mechanical energy. The stator assembly typically includes a core having multitude of ferromagnetic annular layers (or laminations) arranged as a stack. Each lamination has several openings that, when aligned, form axial pathways that extend through the length of the core. Conductive elements such as rods, wires, or the like, typically made from copper or a copper alloy, are wound around the lamination core through these openings. Current passing through these conductors driven by a power source such as a battery or fuel cell generates electromagnetic flux that can be modulated as needed to control the speed of the motor.

Conductive elements are typically insulated to prevent shorting between each other and with adjacent stator core laminations. Such insulation generally includes both a non-conductive coating applied to the surface of each conductive element, and an insulating layer placed around a portion of each element's periphery. However, an insulating layer that more completely circumscribes the conductive elements in a stator core is desirable to further reduce the possibility of shorting and increase the overall reliability of electric machines.

Accordingly, it is desirable to provide an assembly for electrically insulating conductive elements in the stator core of a vehicular electric machine having improved insulating characteristics. Further, other desirable features and characteristics of the present invention will become apparent from the subsequent detailed description and the appended claims, taken in conjunction with the accompanying drawings and the foregoing technical field and background.

SUMMARY OF THE INVENTION

In accordance with an embodiment, by way of example only, an assembly for providing electrical insulation in a stator core of a vehicular electric machine is provided. The stator core has a channel and the assembly comprises a first conductive element disposed through the channel, and a second conductive element disposed through the channel and substantially adjacent to the first conductive element. The assembly also comprises a first electrically insulating film having a first end residing between the first and second conductive elements.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The various embodiments of the present invention described herein provide an assembly for electrically insulating conductive elements in the stator core of a vehicular electric machine. The insulating layer is configured to circumscribe the peripheries of two adjacent conductive elements and provide a continuous barrier that electrically isolates these elements from each other and from the surfaces of adjacent stator core laminations. The insulating layer configured in this manner contains only minimal self-overlap while providing a more reliable insulating barrier compared to conventional designs.

Figure 1:
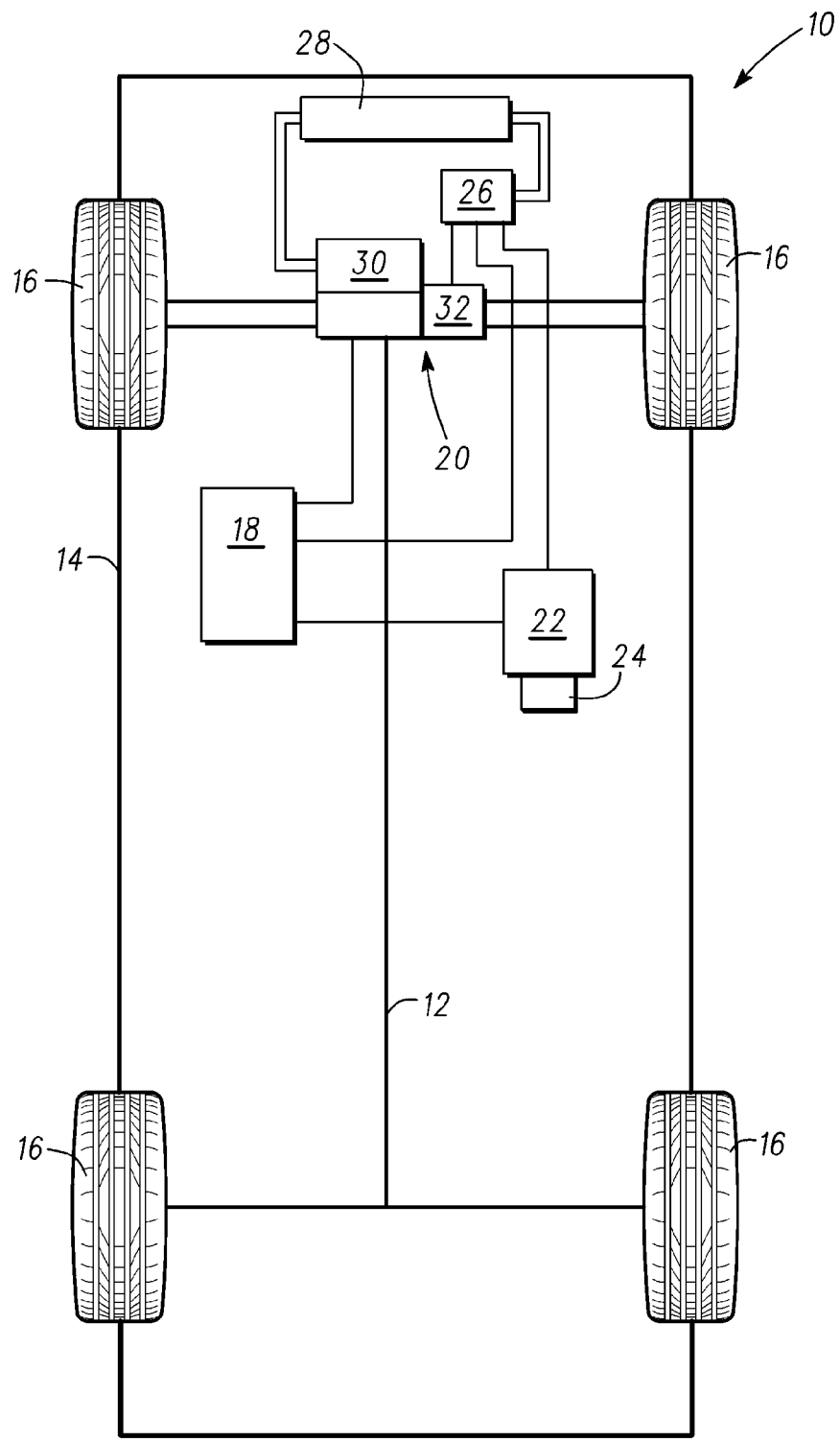
FIG. 1 is a schematic diagram of an exemplary vehicle illustrating a manner in which an embodiment is integrated with various sub-components of the vehicle.

FIG. 1 is a schematic diagram of an exemplary vehicle 10, such as an automobile, according to one embodiment of the present invention. The automobile 10 includes a chassis 12, a body 14, four wheels 16, and an electronic control system (or electronic control unit (ECU)) 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the exemplary embodiment illustrated in FIG. 1, the automobile 10 is a hybrid vehicle, and further includes an actuator assembly (or powertrain) 20, a battery array 22, a battery state of charge (SOC) system 24, a power electronics bay (PEB) 26, and a radiator 28. The actuator assembly 20 includes an internal combustion engine 30 and an electric motor/generator (or electric traction machine) system (or assembly) 32. The battery array 22 is electrically coupled to PEB 26 and, in one embodiment, comprises a lithium ion (Li-ion) battery including a plurality of cells, as is commonly used. Electric traction machine 32 typically includes a plurality of electric components, including stator and rotor assemblies. The stator assembly includes an annular core containing a multitude of annular core laminations, and a plurality of conductors (or conductive elements) extending through these laminations. At least one pair of these conductive elements is electrically isolated from adjacent conductive elements and core laminations by an insulating layer configured in accordance with an exemplary embodiment of the invention. The insulating layer substantially circumscribes the peripheries of the pair of conductive elements and provides a continuous insulating barrier between the conductive elements and other stator core elements.

Figure 2:
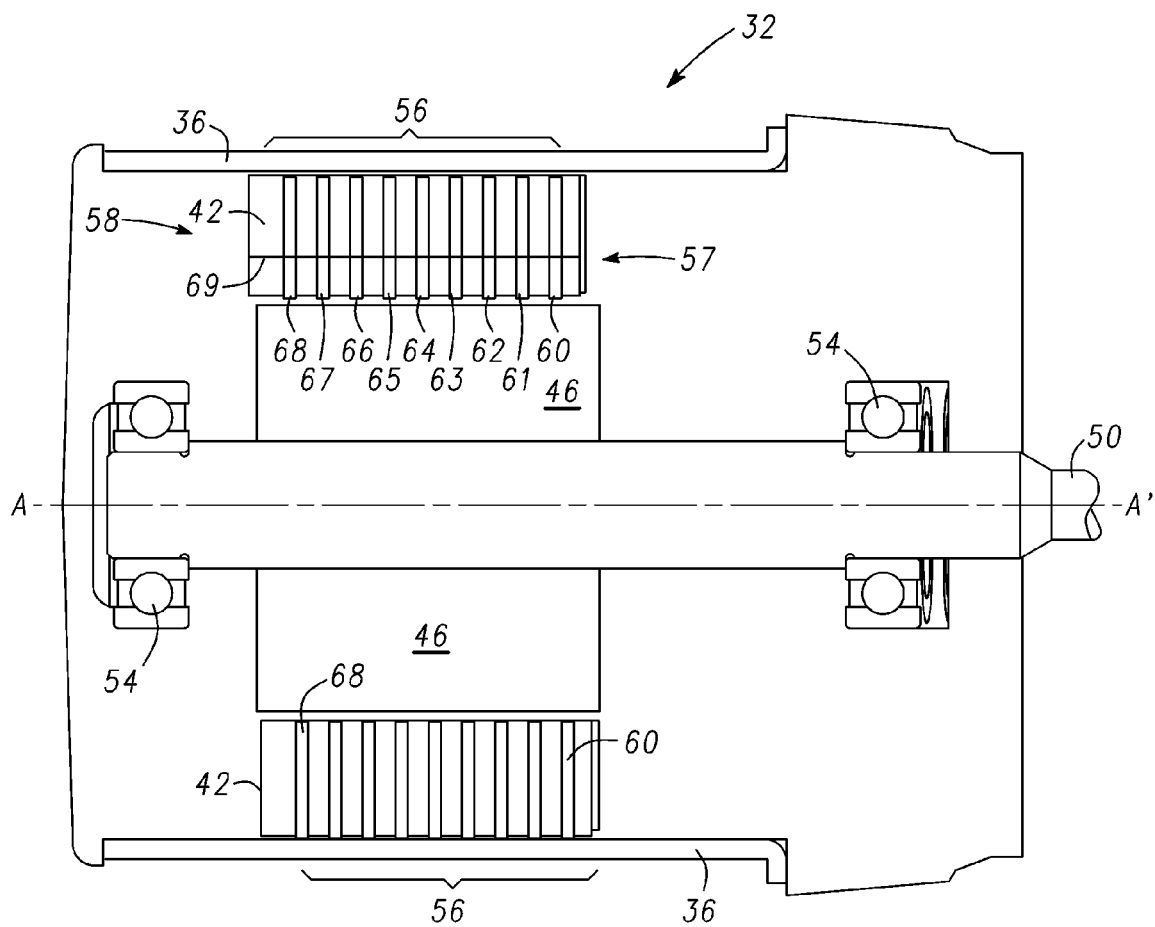
FIG. 2 is a cross-sectional side view of an exemplary vehicular electric machine for use with the vehicle depicted in FIG. 1, in accordance with an exemplary embodiment.

FIG. 2 is a cross-sectional side view of vehicular electric machine 32, in accordance with an exemplary embodiment. It should be noted that many detailed elements commonly found in such an electric machine have been omitted for greater clarity. Electric machine 32 includes a housing 36, a stator assembly 42, a rotor assembly 46, and a shaft 50. Stator assembly 42 is contained within and fixedly coupled to housing 36. Rotor assembly 46 is fixedly coupled to shaft 50, both elements configured for rotation within stator assembly 42 about an axis of rotation A-A'. A set of bearings 54 is coupled to housing 36 proximate either end thereof, and provide support for, and rotational coupling to, shaft 50. Stator assembly 42 also includes a stator lamination core 56 having a first end 57 and a second end 58, and having a plurality of individual annular laminations 60-68 arranged parallel to each other in a stacked, columnar array between these ends. Each individual lamination has at least one opening (or channel) aligned with like openings in each lamination throughout core 56. The aligned openings form an axial (substantially parallel to axis of rotation A-A') pathway through core 56 that may contain any number of conductive elements (represented by conductive element 69) electrically isolated from other elements within core 56 by an insulating layer to be described in greater detail below. During operation, current flows through conductive element 69 of core 56 generating magnetic flux that interacts with flux emanating from rotor assembly 46. The flux interaction between core 56 and assembly 46 causes assembly 46 to rotate with shaft 50 about axis A-A' generating mechanical energy thereby.

Figure 3:
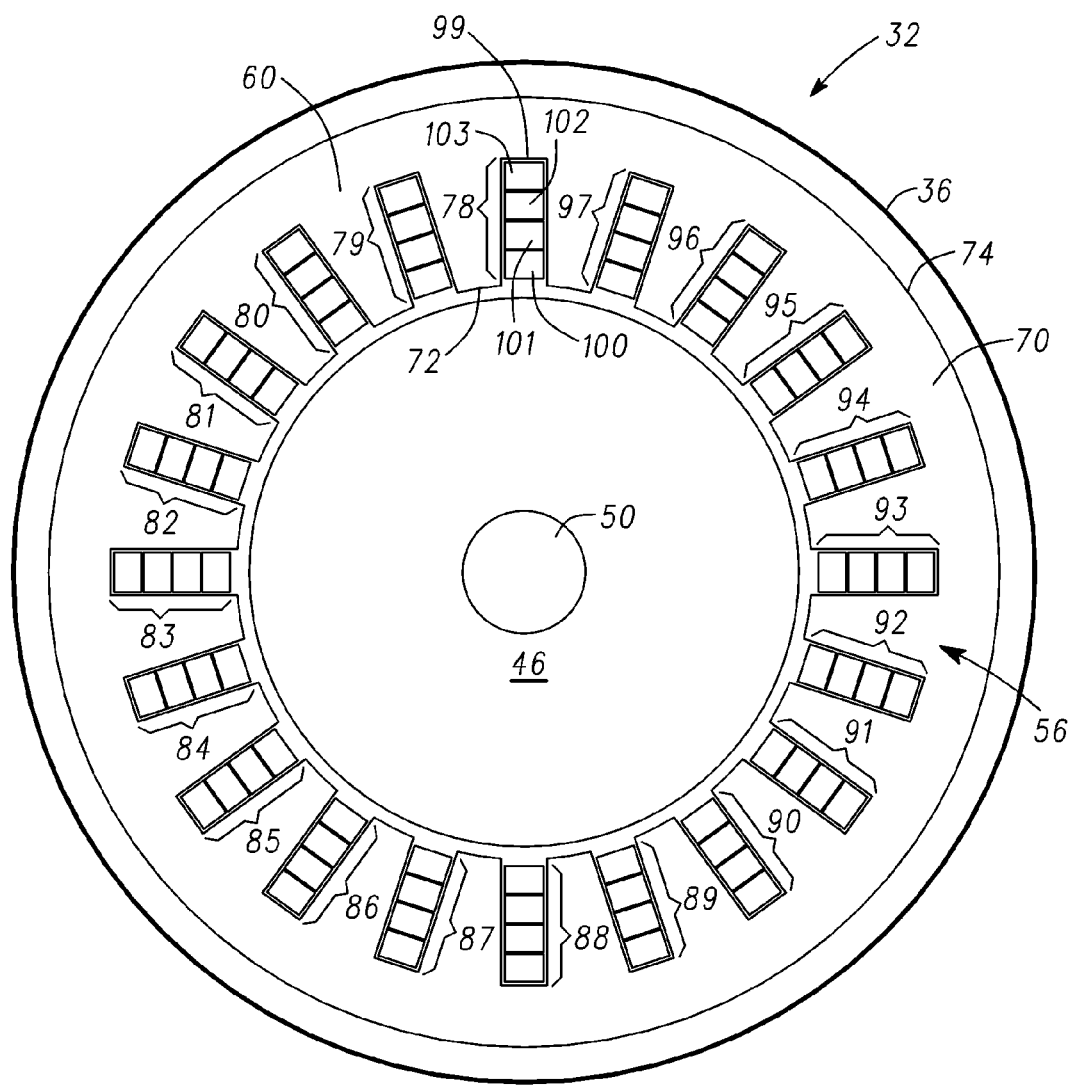
FIG. 3 is a cross-sectional front view of the exemplary vehicular electric machine depicted in FIG. 2, in accordance with an exemplary embodiment.

FIG. 3 is a cross-sectional front view of electric machine 32, in accordance with an exemplary embodiment. Electric machine 32 includes housing 36, lamination core 56, rotor assembly 46, and shaft 50. Stator core 56 is circumscribed about rotor assembly 46, and is fixedly coupled to housing 36. Shaft 50 is rotationally coupled to and supported by bearings 54 (FIG. 2). Rotor assembly 46 rotates with shaft 50 substantially concentrically within core 56. Lamination core 56 includes lamination 60 proximate a first end 57 thereof (FIG. 2) having a ferromagnetic annulus 70 with an inner circumferential edge 72 substantially concentric within an outer circumferential edge 74. Annulus 70 also includes a plurality of slotted openings 78-97 merged with inner circumferential edge 72, and aligned with similarly arranged slotted openings in each of the laminations of core 56. While lamination 60 is illustrated as having 20 slotted openings, it is understood that, depending upon the overall design of electric machine 32, individual laminations within a stator core may contain any number of such openings.

Four conductive elements are disposed through each of slotted openings 78-97, and extend the length of lamination core 56 substantially axially aligned to each other. For example, conductive elements 100-103 are disposed through first slotted opening 78, each of these conductive elements extending through similar openings in each of the laminations of core 56. While four such conductive elements are described and illustrated in FIG. 3 as extending through each slotted opening, it is understood that each opening may contain any number of such conductive elements. Elements 100-103 may assume any form such as that of a rod, a wire, a tube, or the like, having a suitable cross-sectional shape such as, for example, substantially rectangular or circular. Elements 100-103 are made of an electrically conducting material such as, for example, copper or an alloy of copper. Conductive elements 100-103 are coated with a suitable non-conducting coating to provide electrical isolation from other adjacent elements including a side surface 99 of annulus 70 which forms the boundary of first slotted opening 78. Additional insulation is provided by an insulating layer, to be described in greater detail below, which circumscribes adjacent conductive elements into a pairing and forms a substantially continuous electrically insulating barrier around the peripheries of each element.

During operation, current flows through conductive elements 100-103 in first slotted opening 78 generating magnetic flux thereby. Pairings of conductive elements are surrounded by an electrically insulating layer that protects each individual conductive element from shorting to adjacent conductive elements and stator core surfaces.

Figure 4:
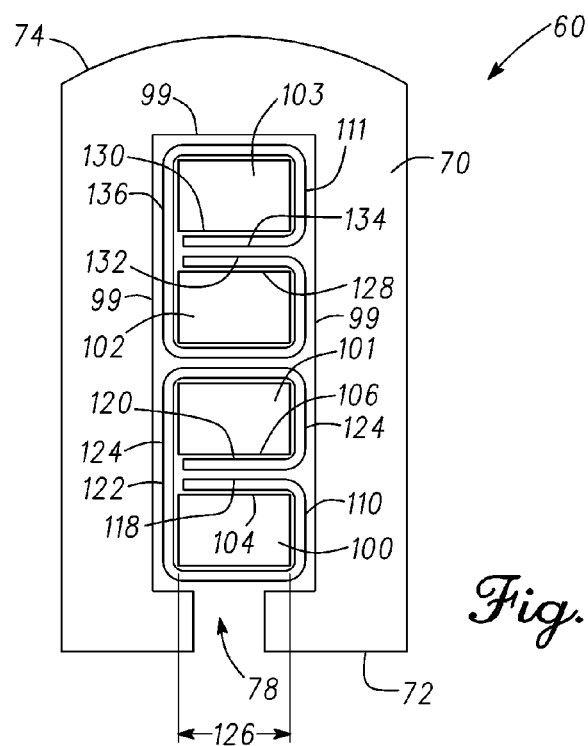
FIG. 4 is a cross-sectional view of a portion of a stator core lamination shown in FIG. 3, and having an insulating layer in accordance with an exemplary embodiment.

FIG. 4 is a cross-sectional view of a portion of lamination 60 in accordance with an exemplary embodiment, and magnified to more clearly illustrate various features of the invention. Lamination 60 includes ferromagnetic annulus 70 having outer circumferential edge 74, and first slotted opening 78 bordering and merged with inner circumferential edge 72. First slotted opening 78 contains first and second conductive elements 100 and 101, respectively, disposed therethrough. First conductive element 100 has a first side 104 and second conductive element 101 has a second side 106, both sides substantially axially aligned and adjacent each other. A first electrically insulating layer 110 resides in first slotted opening 78 and provides an electrical barrier for the pairing of conductive elements 100 and 101 that separates each element from the other and from side surface 99. First insulating layer 110 may be made of a suitable insulating film such as, for example, Nomex® paper. Layer 110 has a first end 118 adjacent first side 104, that overlaps with a second end 120 adjacent second side 106. Ends 118 and 120 are each disposed through first slotted opening 78, residing between and substantially aligned with first and second sides 104 and 106. First insulating layer 110 also has a first section 122 intermediate between ends 118 and 120 that substantially surrounds the remaining peripheries of first and second conductive elements 100 and 101. In one embodiment, first section 122 substantially surrounds the remaining peripheries of first and second conductive elements 100 and 101 without passing between sides 104 and 106. In another embodiment, first insulating layer 110 has a first edge 124 proximate first end 57 of lamination core 56 (FIG. 2) extending between first and second ends 118 and 120 and configured to be B-shaped.

While FIG. 4 shows first and second ends 118 and 120 overlapping substantially over a width 126 of first and second sides 104 and 106, the region of overlap is not limited to this distance, and may comprise any amount of overlap between sides 104 and 106. Further, while ends 118 and 120 overlap each other between sides 104 and 106, first section 122 surrounds the remaining peripheries of first and second conductive elements 100 and 101 without containing an overlapping region. Accordingly, insulating layer 110 provides an improved insulating barrier for shielding elements 100 and 101 from each other and from the side surfaces 99 of first opening 78. Further, the minimal self-overlap of ends 118 and 120 only marginally adds extra insulating material inside the slotted openings.

Third and fourth conductive elements 102 and 103 are disposed through first slotted opening 78 and have third and fourth sides 128 and 130, respectively, substantially aligned to each other and to first and second sides 104 and 106. A second insulating layer 111 substantially surrounds conductive elements 102 and 103 as a pairing, and electrically isolates each of these elements from the other, and from adjacent conductive elements and side surface 99. Layer 111 includes a first end 132 adjacent third side 128 overlapping with a second end 134 adjacent fourth side 130. Layer 111 also includes a section 136 intermediate ends 132 and 134 that substantially surrounds the remaining peripheries of third and fourth conductive elements 102 and 103 without passing therebetween. In one embodiment, first and second sections 122 and 136 overlap each other between second and third conductive elements 101 and 102.

During operation, first and second insulating layers 110 and 111 provide insulation to conductive elements 100 and 101, and 102 and 103, respectively. Each insulating layer forms an electrically insulating barrier which substantially surrounds the individual conductive elements of a pairing of conductive elements to prevent shorting to other conductive elements and other surfaces of lamination 60 such as side surface 99.

Figure 5:
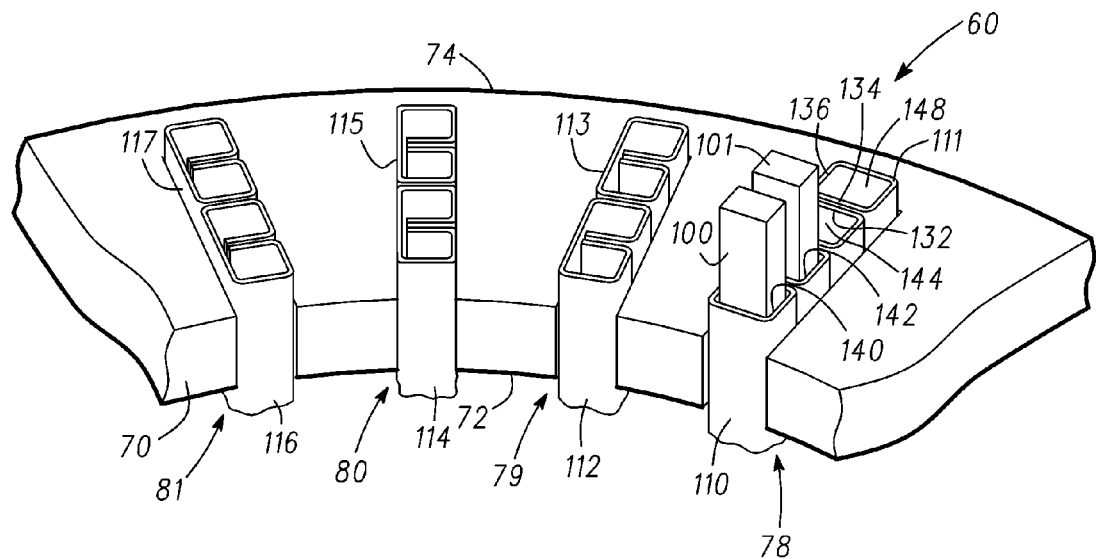
FIG. 5 is an isometric view of the stator core lamination shown in FIGS. 2-4 having a plurality of insulating layers integrated therein, in accordance with another exemplary embodiment.

FIG. 5 is an isometric view of a portion of the individual stator core lamination 60 shown in FIGS. 2-4, and having a plurality of insulating layers integrated therein, in accordance with an embodiment of the invention. Lamination 60 includes annulus 70 having a plurality of slotted openings 78-81 merged into inner circumferential edge 72. Each of slotted openings 78-81 is arranged so as to align with like openings in adjacent laminations forming a continuous channel or pathway that extends substantially axially through stator lamination core 56 (FIG. 2). Two members of insulating layers 110-117 are disposed in each of slotted openings 78-81. For example, first and second insulating layers 110 and 111, respectively, are disposed in first opening 78, each layer extending axially as a continuous film through lamination core 56 (FIG. 2). Insulating layers 110-117 are each configured to form a "B" shape in cross-section, and have two openings. Each opening is thus substantially bounded by a portion of an insulating layer to provide electrical isolation to an individual conductive element.

For the sake of clarity, only first insulating layer 110 is depicted as containing such a pairing of conductive elements, while second insulating layer 111 is shown without conductive elements to better illustrate the form and spatial arrangement of an insulating layer. That is, first insulating layer 110 forms first and second openings 140 and 142, respectively, these openings axially aligned and configured to receive first and second conductive elements 100 and 101, respectively. Second insulating layer 111 includes first and second ends 132 and 134 adjacent and overlapping each other, and extending axially through first opening 78 and across the length of lamination core 56 (FIG. 2). Second insulating layer 111 also includes second section 136 intermediate between first and second ends 132 and 134 that, in conjunction therewith, forms third and fourth openings 144 and 148, respectively. Openings 144 and 148 are each configured to receive and electrically insulate a conductive element (not illustrated) similar to elements 100 or 101. While the foregoing description includes insulating layers described as having ends and sections, it should be understood that each insulating layer is a continuous, integrally-formed layer or film, and that such descriptors refer to portions of the continuous layer rather than to discretely separate elements thereof.

The various embodiments of the present invention described herein provide an insulating layer for conductive elements in a stator lamination core of a vehicular electric machine. The insulating layer has a "B-shaped" cross sectional configuration, and forms an electrically insulating barrier by substantially surrounding the peripheries of each of a pair of conductive elements. The insulating layer thereby prevents these elements from shorting to each other or to core lamination surfaces. This configuration features only minimal self-overlap of the insulating layer, and thus adds only marginal additional weight to a stator assembly. Accordingly, the insulating layer provides enhanced electrical isolation for stator core conductive elements, and may be conveniently incorporated into existing stator assembly designs.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. An assembly for providing electrical insulation in a stator core of a vehicular electric machine, the stator core having a channel, the assembly comprising:
 a first conductive element disposed through the channel;
 a second conductive element disposed through the channel and substantially adjacent to the first conductive element; and
 a first electrically insulating film having a first end residing between the first and second conductive elements;
 wherein the first electrically insulating film further comprises a second end residing between the first and second conductive elements, and wherein the first and second ends overlap between the first and second conductive elements;
 wherein the first electrically insulating film further comprises a first section, intermediate the first and second ends that substantially surrounds the remaining peripheries of the first and second conductive elements; and
 wherein the first section does not pass between the first and second conductive elements.

2. An assembly according to claim 1, wherein the stator core has a first side and a second side, and wherein the first and second ends extend from proximate the first side to proximate the second side.

3. An assembly according to claim 2, wherein the first electrically insulating film further comprises a first edge that resides proximate the first side of the stator core and extends between the first and second ends.

4. An assembly according to claim 3, wherein the first edge is B-shaped.

5. An assembly according to claim 1, wherein the first section does not overlap with itself.

6. An assembly according to claim 1, wherein the first electrically insulating film comprises Nomex® paper.

7. An assembly according to claim 1, further comprising:
a third conductive element disposed through the channel and substantially adjacent to the second conductive element;
a fourth conductive element disposed through the channel and substantially adjacent to the third conductive element; and
a second electrically insulating film having a third end and a fourth end residing in the channel and between the third and fourth conductive elements, and having a second section intermediate the third and fourth ends that substantially surrounds the remaining peripheries of the third and fourth conductive elements.

8. An assembly according to claim 7, wherein the second section does not pass between the first and second conductive elements.

9. An assembly according to claim 7, wherein the third and fourth ends overlap between the third and fourth conductive elements.

10. An assembly according to claim 7, wherein the first and second sections overlap between the second and third conductive elements.

11. A stator assembly for a vehicular electric machine, the stator assembly having a lamination core with an opening therethrough, the assembly comprising:
a first conductive element disposed through the opening and having a first side;
a second conductive element disposed through the opening and substantially aligned to the first conductive element and having a second side adjacent to the first side; and
a first electrically insulating film having a first end and a second end, the first and second ends disposed through the opening and residing between the first and second sides, and having a first section intermediate the first and second ends substantially surrounding and adjacent the remaining peripheries of the first and second conductive elements,
wherein the first section does not pass between the first and second sides.

12. An assembly according to claim 11, further comprising:
a third conductive element disposed through the opening and having a third side;
a fourth conductive element disposed through the opening and substantially aligned to the third conductive element and having a fourth side adjacent to the third side; and
a second electrically insulating film having a third end and a fourth end, the third and fourth ends disposed through the opening and residing between and substantially aligned with the third and fourth sides, and having a second section intermediate the third and fourth ends substantially surrounding the remaining peripheries of the third and fourth conductive elements without passing between the third and fourth sides.

13. An assembly according to claim 12, wherein the first, second, third, and fourth ends are substantially parallel to each other.

* * * * *